United States Patent Office 2,838,045
Patented June 10, 1958

2,838,045
MICROBICIDAL BANDAGE

John W. Ryznar, La Grange Park, Ill., assignor to National Aluminate Corporation, Chicago, Ill., a corporation of Delaware No Drawing. Application October 29, 1956
Serial No. 618,684

8 Claims. (Cl. 128—156)

This invention relates to microbicidal bandages, and particularly, to a new and improved bandage of an ion exchange membrane provided with a microbicidal agent.

Prior to the invention, ion exchange resins had been provided with microbicidal agents adsorbed thereon, and it had also been proposed to provide compositions containing an ion exchange resin with adsorbed microbicidal agents for use on the surface of the body for protection against bacteria. According to one proposal, an insoluble plastic membrane was provided which contained ion exchange resin particles embedded in the membrane. An adsorbate of a cationic or anionic antibacterial agent would act to release the agent on contact of the membrane with the serum when applied to open wounds.

The present invention has for its object to provide a new and improved microbicidal bandage of an ion exchange membrane containing an adsorbed microbicidal agent, which provides a number of advantages.

A particular object is to provide an ion exchange membrane which contains a polyelectrolyte in homogeneous molecular dispersion, and a microbicidal agent likewise homogeneously adsorbed on the membrane, which article constitutes a very useful bandage or dressing.

Another object is to provide a bandage of the type described which is not dependent upon the factors which result from dispersing resin particles in a film, for example, the particle size and the surface area of the particles.

An additional object is to provide a bandage which has excellent stability, strength, durability, and chemical resistance.

A further object is to provide a bandage which may be placed adjacent to the body without causing irritation or other adverse effects, in the manner of a conventional bandage or dressing, and which will act to provide a slow release of a microbicidal agent.

Another object is to provide a microbicidal bandage of a very thin porous ion exchange film, on which an ionic microbicidal agent may be adsorbed by ion exchange and from which the agent is released by subsequent ion exchange. The thin film has minute pores through which ions are exchanged, and it is useful for transferring a microbicidal agent through the membrane to the point of application.

The invention provides these and other objects and advantages, as will appear on reference to the specification.

In a preferred form, the invention provides a microbicidal bandage which includes an ion exchange membrane of a homogeneous molecular dispersion of a water-insoluble, acid and alkali-resistant thermoplastic film-forming polymer and a substantially linear polyelectrolyte, and an ionic microbicidal agent adsorbed on the ion exchange membrane. The polyelectrolyte may be either electronegative or electropositive, exchanging either cations or anions, respectively. The microbicidal agent is then preferably either a cationic or an anionic agent, respectively.

The invention contemplates microbicidal bandages which contain any of the various ionic agents which destroy or inhibit harmful microorganisms, such as bacteria and fungi. For example, the microbicidal agent may be an antibiotic such as streptomycin, terramycin, aureomycin and penicillin. Metallic ions having bactericidal activity may be employed, such as mercury, silver and copper. Likewise, various microbicidally active ionic chemical agents may be provided on the ion exchange membranes.

The ion exchange membranes are either cation exchange or electronegative membranes, or anion exchange or electropositive membranes. They constitute finely porous films of homogeneous molecular dispersions of film-forming polymers and polyelectrolytes, as referred to above, which are physiologically inert in topical applications. The membranes are preferably produced as described in copending applications of Gregor and Patzelt, Serial No. 511,062, filed May 25, 1955, and Serial No. 513,944, filed June 8, 1955. In order to avoid undue repetition, these applications and the disclosures thereof are incorporated herein by reference.

As described in the foregoing patent applications, the walls of the pores of the membranes carry dissociable groups. The groups may be acidic, such as carboxylic groups, in the case of the cation exchange or electronegative membranes, or basic, such as amino groups, in the case of the anion exchange or electropositive membranes. The dissociable groups are an integral part of the membrane structure. The cation exchange membranes adsorb cations thereon, or exchange cations for those originally present on the membranes. These membranes also pass cations therethrough to the exclusion of anions, that is, they are permselective, when appropriate ion concentrations are maintained on the opposite sides of the membrane. The anion exchange membranes function in like manner, exchanging anions on the membrane.

These membranes are especially suited for preparation of microbicidal bandages therefrom, in that they may be very thin while still possessing the other properties mentioned. On the other hand, the physical properties of other membranes are not so desirable. Thus, collodion has been employed as a material for making membranes, but it has relatively poor chemical resistance. On the other hand, the preferred membranes are chemically stable and inert to acids and alkalies over prolonged periods of contact. The membranes prepared by impregnating inert matrices with finely ground ion exchange resins are undesirably thick and are subject to the limitations of the resin particles, their dispersion and the availability of the ion exchange centers of the particles. Disadvantages may also result from providing a material in contact with the body which contains a substance in the form of particles.

The membrane described in the above applications are preferably cast intimate mixtures of the film-forming polymer and the polyelectrolyte, being cast from a solution thereof and thus producing a homogeneous molecular dispersion of the materials, which is distinct from the type of mixture obtained when a solid substance is dispersed in another material. The cast film is preferably treated with a polar liquid after formation of the film. The polyelectrolyte has a minimum average molecular weight of about 5000.

In a preferred form, the membrance is an intimate mixture of a water-insoluble substantially linear polyvinyl-type thermoplastic film-forming resin and a water-soluble substantially linear polyvinyl type polyelectrolyte, in the form of a thin finely perforate film. By reference to "substantially linear" is meant that the polymers are not substantially cross-linked and contain not exceeding two percent of a cross-linking agent by weight of the polymer. The infusible, insoluble substances which are for the most part brittle and tend to crack upon drying are not suitable for use in the invention.

The polyvinyl-type polymers are those derived by the addition of polymerization of at least one monoolefinic compound through the unsaturated aliphatic group. They are preferably addition polymers of the unsymmetrically substituted ethylene class, comprising polymers obtained by polymerization or copolymerization of monomers containing a

group, such as vinyl halides, vinylidene halides, vinyl esters, styrenes and acrylics.

A method of producing the membrane involves providing an organic solvent solution of the film-forming polymer and of the polyelectrolyte, and casting a film of the polymers therefrom. The proportion of the polyelectrolyte in the mixture is at least 10%, preferably up to 30%, and at times as high as 60% by weight of the mixture. Especially valuable films are produced with a minor proportion of between 15% and 30% by weight of polyelectrolyte contained therein.

The solution is provided in a thin layer, and solvent is removed by evaporation, to produce the membrane in the form of a finely porous film. Preferably, the film in dry or solid form is contacted with a polar liquid. The resulting membrane has the properties described above, is water-insoluble, and contains a plurality of functional groups capable of dissociation in aqueous media into cations or anions which are attached to the polymer, and, respectively, anions or cations capable of exchange or migration in aqueous media.

The composite films are at least 0.0001 inch in thickness and preferably from 0.001 to 0.002 inch thick. They may be thicker, and they preferably have a maximum thickness of about 0.01 inch.

The plastic film-forming materials used in the present invention may be of several types both as regards their chemical structure and their physical properties. The plastic film-forming material should be capable of being cast into a thin homogeneous film from an organic solvent casting solution. This film should be chemically stable, resistant to acids and alkalies, and water insoluble, in order to provide ultimately a satisfactory composite membrane film. The film-forming material must also be compatible when dissolved or dispersed in a casting solution with the polyelectrolyte which is incorporated therewith at the time the membrane is cast.

The most useful type of film-forming plastic materials are those derived from the copolymerization of vinyl chloride and acrylonitrile. These polymers may range from between 45% and 80% by weight of vinyl chloride, preferably, between 60% and 80% vinyl chloride, the balance being acrylonitrile. Their specific viscosities at 20° C. are preferably from 0.2 to 0.6 (0.1 gram in 50 cc. acetonyl acetone). Such polymers are described in U. S. Patent 2,420,565. A typical polymer of this type is a commercial material sold under the trade name Dynel. This material contains a major portion of vinyl chloride and a minor portion of acrylonitrile and varies somewhat in its constituents from batch to batch as manufactured. The material as supplied in its filament or fiber form has a specific gravity of 1.31 at 81° F., a tenacity wet or dry of 2.5–3.5 grams per denier and a 42% to 40% elongation wet or dry. The material is soluble in acetone, cyclohexanone and dimethylformamide. It has a strain release beginning at 240° F. and a softening range between 300° to 325° F.

Polymers containing vinylidene chloride and vinyl chloride in a percent by weight of about 90% to 10% and copolymers of vinylidene chloride and acrylonitrile are also useful. Another type of useful polymer is the copolymers produced by the copolymerization of polyvinyl alcohol and butyraldehyde. This latter copolymerization produces polyacetals whose film-forming properties, when reacted under the proper conditions, are similar to those indicated for the vinyl chloride-acrylonitrile polymers. The above polymers are all copolymers but homopolymers produced by the polymerization of vinyl chloride and vinylidene chloride are also suitable.

The above listed polymers are only indicative of the general class of polymers that may be employed. The type of polymer that is useful is necessarily limited to its water insolubility, chemical stability, and acid and alkali resistance. It is also limited by its solubility characteristics in organic solvents and its compatibility with the polyelectrolyte with which it is incorporated, as will be hereinafter described. It is noted here, however, that the solvents that are generally used for casting these membranes are in part polar and will tend to precipitate many of the commercially available film-forming plastic materials.

The preferred plastic film materials have a high degree of plastic flow and are generally clear to opaque in physical appearance. While they are water-insoluble, they have the ability to take up a quantity of water or polar organic solvent. This characteristic is important in the process used in producing the membranes, and it also assists in the use of the membranes as microbicidal bandages.

The preferred polyelectrolytes which impart anionic, and thus electrophilic, properties to the thin plastic films are generally water-soluble, although this property is not necessary for the purpose of the invention. A preferred feature is the provision of the same type of basic polymer structure in both the film-forming material and the polyelectrolyte, that resulting from the polymerization of vinyl-type monomers. The respective polymers are thus characterized by a high degree of compatibility which results in the formation of a uniform homogeneous membrane.

The functional groups of the electronegative polyelectrolyte may be of several types. For example, the functional or side chain groups of these polymers may be carboxylic, phosphonous, phosphonic and sulfonic. The preferred type polymer is that derived by the sulfonation of linear polystyrene. These materials preferably contain about one monosulfonic group per aromatic nucleus.

The electronegative polyelectrolytes that give most satisfactory results when employed in this invention are primarily homopolymers derived from the polymerization of one olefinic compound. For example, polystyrene sulfonic acid which is derived from the polymerization of styrene gives superior results. In a similar fashion polyacrylic acid gives good results, although the ionization of the carboxylic acid groups is not as strong as the ionization of the sulfonic acid groups.

Numerous useful anionic polymers are described in U. S. Patent 2,625,529, which describes synthetic water-soluble polyelectrolytes having a structure derived by the polymerization of at least one monoolefinic compound through the aliphatic unsaturated group, the structure being substantially free of cross-linking.

Of the electropositive polyelectrolytes, the preferred polymers have as their functional group a quaternary ammonium nitrogen atom. This nitrogen atom is preferably attached to the polymer by being associated with an aromatic nucleus which is a side group in the linear chain. By the expression "associated with the aromatic nucleus" is meant to include nitrogen atoms which (a) are a part of the aromatic nucleus, e. g., poly N-methyl, 2-vinyl-pyridinium iodide; (b) are directly attached to the aromatic nucleus, e. g., polystyrene o- and p-trimethyl ammonium iodide; and (c) are attached to the aromatic nucleus by a divalent hydrocarbon radical, e. g., poly (vinyl benzyl trimethyl ammonium chloride).

In addition to polymers containing a nitrogen atom associated with an aromatic nucleus, quaternized poly-N-vinyl amines and the poly-N-allyl amines may also be used. In the case of these latter compounds, care must be used in preparing the quaternary derivatives so that little, if any, cross-linking occurs.

Other polyamines of the type described above may be used, wherein the functional nitrogen atoms are in the form of primary, secondary, or tertiary amino groups converted to the salt form. Additional useful polyamines are those described in the above referred to U. S. Patent No. 2,625,529, particularly columns 5 and 7.

The polyelectrolytes that give most satisfactory results are primarily homopolymers derived from the polymerization of one olefinic compound. For example, a poly(vinyl benzyl trialkyl ammonium salt) gives superior results.

In a preferred embodiment of the invention, poly-(vinyl benzyl trimethyl ammonium halide, e. g., chloride) is used, prepared for example by the chloromethylation and subsequent amination with trimethylamine of polystyrene in known manner.

The membranes are generally produced by dissolving the plastic film-forming material and the polyelectrolyte in a suitable solvent or solvent system composed of organic liquids. The solvent is then allowed to evaporate with the film being formed by any suitable mechanical means. After the continuous film has been formed and dried, it is then treated with a polar liquid so that a pore structure having a plurality of fixed negative charges is formed.

The plastic film-forming material and the polyelectrolyte generally will be of a nature such that it is necessary or preferable to employ a cosolvent system to uniformly dissolve both of the ingredients. However, in some instances, it has been found that a single solvent is all that is necessary to form suitable cation membranes. The solvent system must be such that films having a thickness of at least 0.0001 inch are producible therefrom. The solvent system should dissolve preferably at least 1.6% by weight of the plastic film-forming material and preferably at least .1% of the polyelectrolyte.

Solvents for the preferred vinyl chlorideacrylonitrile film-forming polymers that have given satisfactory results are acetone, nitromethane, nitroethane, dimethylformamide, cyclopentanone and cyclohexanone. In addition to these solvents, dimethylacetamide, N,N-dimethylacetamide and N- N, N', N'-tetramethyoxamide may be used. Suitable solvents for the polyelectrolyte may be drawn from a wide variety of materials, the best results being obtained by using a low molecular weight aliphatic alcohol having not more than six carbon atoms. A cosolvent system is provided by combining a solvent for the film-forming material with one for the polyelectrolyte.

In the cosolvent systems, excellent electronegative membranes have been obtained by using various ratios of cyclohexanone and isopropyl alcohol or methyl alcohol. Thus, for example, membranes were produced very successfully where this system was employed with the plastic film-forming material Dynel, formed by the polymerization of vinyl chloride and acrylonitrile, and polystyrene sulfonic acid.

In the cosolvent systems for electropositive membranes, various ratios of cyclohexanone and methyl alcohol or ethyl alcohol may be employed. Thus, for example, membranes were produced very successfully where this system was employed with Dynel and poly (vinyl benzyl trimethyl ammonium chloride).

In some cases, such as with dimethylformamide, it is not necessary to use an additional solvent for the polyelectrolyte. However, the two-solvent system is preferred due to the fact that the films thus formed generally have greater mechanical strength than those produced from a single solvent system.

In choosing solvents for the dissolution of the plastic film-forming material and the polyelectrolyte, it is preferred that the boiling points of the solvents be less than the point at which the plastic film-forming material tends to exhibit properties of thermoplasticity.

In forming the solutions of the plastic film-forming material and the polyelectrolyte, care is taken in proportioning the solvents, as they will generally be mutually exclusive in their polar and nonpolar characteristics. In the case of polystyrene sulfonic acid or poly (vinyl benzyl trimethyl ammonium chloride), the highly polar nature of the material tends to make it extremely soluble in such polar solvents as water and methyl alcohol. Upon the addition of nonpolar solvents, the polyelectrolyte is sometimes coagulated from the solution, thus making it difficult to cast a film containing this material. The correct proportions are determined by simple experimentation.

Thus, for example, a mixture of cyclohexanone or cyclopentanone and methanol in a weight ratio of about 2–8.5:1, or a mixture of cyclohexanone or cyclopentanone and isopropanol in a ratio of about 2–11.5:1, provides a good cosolvent system for the preferred vinyl chloride-acrylonitrile film-forming copolymers and polystyrene sulfonic acids. Employing a polymer mixture of about 70–90% by weight of film former and 30–10% of polyelectrolyte, and dissolving about 2–8%, by weight of the solution, of the polymer mixture in the cosolvent system, very useful membranes are cast from the solutions.

A mixture of cyclohexanone or cyclopentanone and methanol in a weight ratio of about 2–8.5:1, or a mixture of cyclohexanone or cyclopentanone and ethanol in a ratio of about 2–7:1, provides a good cosolvent system for the preferred vinyl chloride-acrylonitrile film-forming copolymers and poly (vinyl benzyl trialkyl ammonium salts). Employing a polymer mixture of about 7–90% by weight of film former and 30–10% of polyelectrolyte, and dissolving about 2–8%, by weight of the solution, of the polymer mixture in the cosolvent system, very useful membranes are cast from the solutions.

As a general rule, the more viscous the solution at a given concentration for a given solvent or a solvent system the more desirable the membrane that is cast therefrom. Increased viscosity provides increased mechanical strength in the film.

It is desirable to control the thickness of the films as much as possible. The films, as has been previously indicated, should be at least 0.0001 inch and preferably from .001 to .002 inch. Satisfactory membranes having the thicknesses in excess of 0.05 inch have been produced using the techniques described. In the case of cast Dynel-polystyrene sulphonic acid membranes, the best results have been obtained by using solutions having dissolved therein from 2% to 8% of the Dynel-polystyrene sulphonic acid mixture. Excellent results have been obtained by using a 4% solution of 80% Dynel and 20% polystyrene sulphonic acid in a cyclohexanone-isopropanol or cyclohexanone-methanol solvent system.

In the case of cast Dynel-poly (vinyl benzyl trimethyl ammonium chloride) membranes, the best results have been obtained by using solutions having dissolved therein from 2% to 8% of the Dynel-polyelectrolyte mixture. Excellent results have been obtained by using a 3–4% solution of 80% Dynel and 20% of the polyelectrolyte in a cyclohexanone-methanol or cyclohexanone-ethanol solvent system.

After the plastic film-forming material and the polyelectrolyte have been suitably dissolved in a given solvent or solvent system, they are then formed by any suitable mechanical means into thin films. The basic principle of forming the membranes is based upon the evaporation of the solvent, leaving a film cast upon a suitable surface or mold. The solutions may be passed through a long slot onto a rotating drum, whereby a film forms on the drum and is dried. The film is subsequently peeled off. The material may be poured on a continuous moving belt that has provision for controlled heat which will allow the film to dry. While any of the know commercial methods for forming these films may be employed, the membranes illustrated herein were cast in the following manner:

Three ml. of the casting solution was allowed to spread on a 4-inch by 4-inch by ¼-inch glass plate, and the resulting thin liquid film or layer was dried on a commercial hot plate. The temperature of the glass plate was approximately 95° F. The resulting membrane was removed from the glass plate by soaking in distilled water.

In using the same technique, larger membranes were cast on a larger glass plate measuring 12 inches by 15 inches by ¼ inch which was suspended above a commercial hot plate equipped with an adjustable thermostatic control. When the temperature of the glass plate attained equilibrium, approximately 95 ml. of a casting solution was allowed to spread over the entire surface. The resulting membrane was removed from the glass plate by immersion in deionized water.

In addition to casting membranes by drying them on a glass plate, several were also prepared by drying on a rotating drum. This latter procedure was substantially as follows:

The membranes were cast on a highly polished chromium-plated drum. This drum was rotated on its axis in a horizontal position with an adjustable speed motor and gear assembly. A 250-watt infrared bulb was placed above the drum so that the temperature of the drum could be maintained at the desired value. When the temperature of the drum attained equilibrium, a pan of casting solution was placed under the drum so it extended into the solution approximately ½ inch. The drum was rotated in this casting solution for a period of time, and the pan was removed. Rotation was continued until the membrane dried, and the latter was removed by rotating in a pan of deionized water. Multi-layer films were cast on the rotating cylinder by allowing the previously cast film to set before applying another coating.

In addition to casting the films by these techniques, several other methods may also be used with equal effectiveness. The films may be formed by building up several thin films by known multiple casting techniques whereby films of varying thicknesses may be prepared.

The casting solutions may be sprayed or cast upon preferably porous surfaces which act as bases, supports or frameworks to strengthen the films. In this manner, composite bandages may be produced, for protective purposes, providing additional utility in the treatment or performing other functions.

The evaporation of the solvent from the casting solution may be accomplished at room temperature, or the temperature may be slightly above, but in no event should the heat applied exceed the decomposition point of the membrane ingredients. Temperatures ranging from 70° F. to 145° F. are generally satisfactory.

After drying the films for a period of time, they are placed in a polar solvent whereby the desired pore structure is obtained. This may be accomplished by either of two methods or by a combination of the two.

The first method is accomplished by partial leaching with a polar solvent to replace part of the casting solvent. Leaching is broadly defined as the process of washing or extracting soluble constituents from an insoluble material. In the process of this invention a phenomenon similar to the coagulation of suspended solids is apparently also exhibited, centralizing the polyelectrolyte. The leaching process has application in the production of thin membranes that are about .002 inch and greater in thickness. In carrying out this process, the membrane is first dried until all visible traces of solvent are removed, and the film has taken on a rigid form. The drying time is relatively short. In the case of Dynel-polystyrene sulfonic acid films or Dynel-poly (vinyl benzyl trimethyl ammonium chloride) films from cyclohexanone-methanol, a period of about one hour at 100° F. is satisfactory. The membrane is then treated with a polar solvent such as water or a lower aliphatic alcohol for a period of time, e. g., one to two hours, after which the solvent is removed by drying. The membrane is then ready for use.

Due to the short drying time, there remains in the pore structure of the plastic film a relatively large amount of the nonpolar solvent. When the membrane is bathed in the polar solvent, large amounts of the nonpolar solvent tend to be displaced. The conditions are controlled to regulate the partial displacement of nonpolar solvent, to avoid the tendency of the structure of the plastic material to become loosened to the point of degradation. When this happens, the membrane loses its physical strength. Good results have been obtained with thicker films by applying the polar solvent to the film with a small atomizer.

In leaching the thicker membranes, it is preferred to use a stock formula in preparing the membranes and to test various leaching solvents as well as drying times, and the amount of solvent and duration of treatment to determine the optimum techniques to be used.

The second method of preparing membranes so that they will contain a plurality of pores having functional groups contained therein, which is especially useful in treating the thinner membranes, is to prepare membranes having a thickness of approximately 0.0001–.002 inch and to allow them to dry at approximately 15 to 70 hours at a temperature of 70° F. to about 145° F., preferably 90–115° F.

In preparing films of this thickness, the thickness of the film may readily be controlled by the amount of plastic film-forming material and polyelectrolyte contained in the solvent or solvent system used to prepare the casting media. For example, in the above cases of Dynel and the named polyelectrolytes, casting solutions containing about 3–4% solute which consists of the plastic film-forming material and the polyelectrolyte in the ratio of about four to one have given very good results. By forming the film on a glass plate as described, films generally having a thickness of about .001 inch may be produced and have extremely good properties.

When the films are dried for periods of time of about 15–20 hours at about 140° F., the amount of solvent contained in the plastic film-forming material tends to be driven from the pores, and a mechanical tightening or contraction of the film surface tends to take place. At about the end of the 15–20 hour period, the pore areas become relatively fixed and more contracted than in the case of the one-hour drying. Other conditions of time and temperature give the same results. At this time, the films are treated with a polar solvent such as water, methyl alcohol, or isopropanol. This latter mode of operation may be conveniently referred to as hydration.

By using the hydration technique and keeping the film within the thickness indicated, no special degree of caution need be exercised. The films may remain in the polar solvent for indefinite periods of time, and the hydration, which is fixed by the physical and chemical nature of the films, is uniform since only a given amount of polar solvent will migrate into the film matrix and form a uniform pore structure throughout.

It is preferred not to dry the membranes too completely, as the film tends to contract and reduce the porosity. The porosity may be regained by placing the membrane in a polar solvent for an extended period of time.

In the above discussion of the processes of leaching and hydration, it is to be understood that these discussions are theoretical in nature, and the invention is not limited thereto. It is sufficient that the membranes may be produced by substantially removing the solvent from the film forming material, drying the film to partially remove the solvent therefrom, and, preferably, then treating it with a polar solvent.

The ion exchange membranes prepared as described above may be provided with a microbicidal agent adsorbed thereon by any suitable method. Adsorption of the ionic agents takes place in the same manner and by the same or comparable methods as are known for ion exchange materials generally. In a preferred method, the cation or anion exchange membranes are immersed or soaked in a solution of the microbicidal agent. With a cation exchange membrane, a cationic microbicidal agent exchanges for the cation of the membrane. Similarly, anionic agents are adsorbed on the anionic exchange membranes. The solvent for the active agent is chosen according to its characteristics. Thus, streptomycin, terramycin, penicillin, or silver nitrate may be dissolved in water and the active ion adsorbed therefrom. The materials having lower water solubility, such as phenyl mercuric acetate, may be adsorbed from an organic solvent solution, such as an alcoholic solution.

The membranes containing adsorbed microbicidal agent are then ready for use as bandages or the like, or they may be dried until visibly dry. They are suitably formed for use as bandages, or the membranes may first be formed as bandages and then treated with the active agent. In use, it is recommended to place the bandage close to the surface being treated and maintain a moist or liquid condition between the two. In this manner, exchange may take place, with the ions of the microbicidal agent which are on the membrane being replaced by ions of like sign from the adjacent liquid, thus causing slow prolonged release of the active agent. Alternatively, a wet pack may be employed on the outer surface of the bandage, to create conditions causing transferral of the active ions to the area adjacent the treated surface.

While the microbicidal bandages or membranes are preferably preformed, they may be formed in place. Thus, for example, a mixture of a microbicidal agent and the membrane-forming or casting solution may be prepared and sprayed or otherwise coated directly on the surface to be treated, where the bandage in the form of a film is formed upon evaporation of the solvent. The casting solution is preferably selected to dissolve the microbicidal agent. Similarly, composite bandages as previously referred to, may be produced. The invention contemplates bandages prepared in such ways, and it embraces the mixtures adapted for coating a surface to produce a microbicidal bandage thereon.

The following examples demonstrate preparation of cation and anion exchange membranes as employed in the preferred practice of the invention, but it will be understood that the invention is not limited to these particular membranes and methods, which are given only for illustrative purposes.

Example 1

A cation exchange membrane was prepared which contained 77% of Dynel by weight and 23% of polystyrene sulfonic acid having an average molecular weight of about 70,000. The electrolyte was in its free acid or hydrogen form. The membrane was prepared by casting a mixture of the ingredients from a 3% solution thereof in a solvent solution containing 67% of cyclohexanone and 30% of methanol, on a glass plate at a temperature 120° F. as described above. After drying at 120° F. for 17 hours, the resulting membrane was removed by soaking about 1 hour in deionized water. The membrane had a thickness of 0.0035 inch. It was stored in deionized water prior to use.

Example 2

An anion exchange membrane was prepared which contained 73% of Dynel by weight and 27% of poly-(vinyl benzyl trimethyl ammonium chloride) having an average molecular weight of about 20,000. A solution was prepared containing 3% of the mixture of the polymers, 77% of cyclohexanone and 20% of methanol. The solution was cast on a glass plate as described above, and the film was dried at 120° F. for 17 hours and then removed by soaking about 1 hour in deionized water. The film was 0.0035 inch thick. It was stored in deionized water.

The following examples illustrate the microbicidal activity provided by the bandage materials according to the invention and the release of microbicidal agent therefrom.

Example 3

The cation exchange membrane of Example 1, in the hydrogen form, was cut into three discs having a diameter of 1 inch, and the discs were soaked in a 30 ml. quantity of a 1% aqueous solution of streptomycin. After 30 minutes, the solution was discarded and replaced with the same quantity of fresh solution. The several discs were then allowed to soak in the fresh solution for 17 hours. The solution was discarded, the films washed by soaking in deionized water for 2 hours, and the washing process repeated. The films were then allowed to soak about 12 hours in deionized water, after which they were allowed to soak in deionized water several additional times for periods of about 2 hours.

Agar plates were prepared with 20 ml. of melted Penassay agar in a Petri plate. They were inoculated with 0.2 ml. of a 24 hour culture of *Micrococcus pyogenes* var. *aureus*, which is a gram positive bacteria. Agar plates containing 20 ml. of melted tryptone glucose extract were prepared and inoculated with 0.2 ml. of a 17 hour culture of *Aerobacter aerogenes*, which is a gram negative bacteria.

One active membrane disc was removed from the deionized water wash bath and, while still wet, placed in the center of each of three replicate agar plates for each organism. The discs were found to curl on the agar so that for the first named assay plates, an average of about 30% contact of the film with the agar was obtained. The contact with the second set of agar plates was about 60%.

Control membranes which had not been treated with the antibiotic were also contacted with the agar in the same manner. These films also curled, so that in the plates inoculated with the first named organism, the average contact was about 60%, and that of the second group was about 40%.

The plates were incubated for three days at 37° C. and 30° C. for the respective organisms. At this time, it was found that the average zone of inhibition of *M. pyogenes* was 32 mm. The average zone of inhibition for *A. aerogenes* was 31 mm. The controls produced no inhibition of growth.

Example 4

The procedure of Example 3 was repeated, soaking the membrane discs in a 1% aqueous suspension of terramycin quaternary salt. The test was conducted with *M. pyogenes*.

The average contact of the discs with the agar was about 50%. The diameter of the inhibition zone was 40 mm. The control was the same as in Example 3.

Example 5

The procedures of Example 3 were repeated for the anion exchange membrane of Example 2, in the chloride form. The discs were soaked in a 1% aqueous suspension of terramycin quaternary salt. The tests were conducted with *M. pyogenes* and *A. aerogenes*.

The discs maintained complete contact with the agar in each case. The average zone of inhibition of *M. pyogenes* was 35 mm. The average zone of inhibition of *A. aerogenes* was 34 mm. Control membranes which were not treated with the antibiotic maintained complete contact with the agar and produced no inhibition of growth in each case.

It will be observed that both cation and anion exchange membranes treated with terramycin exhibited microbicidal activity. This result is apparently due to amphoteric properties of terramycin, causing it to be adsorbed on either of the cation and anion exchange membranes.

Example 6

The procedure of Example 3 was repeated, soaking the membrane discs in a 1% solution of phenyl mercuric acetate in isopropanol, the washings being carried out with isopropanol. The films were washed finally by soaking about 12 hours in deionized water, followed by several washings with deionized water for 2 hour periods. The test procedures of Example 3 were repeated, and the activity of the discs was also tested against *Aspergillus niger*, a fungus. One milliliter of a spore suspension of *A. niger* was mixed with 300 ml. of melted Sabouraud agar, and 20 ml. quantities of the mixture were placed in Petri plates.

The membrane discs curled on each agar plate, averaging 30% contact of the disc in each case. The average contact area for control discs, not treated with bactericidal agent, was about 60% for *M. pyogenes*, 40% for *A. aerogenes*, and 60% for *A. niger*.

A zone of inhibition was produced in each case, being 37 mm. for *M. pyogenes*, 34 mm. for *A. aerogenes*, and 55 mm. for *A. niger*. There was no inhibition by the control in each case.

Example 7

The procedure of Example 3 was repeated for the anion exchange membrane of Example 2, in the chloride form. The discs were soaked in a 1% solution of phenyl mercuric acetate in isopropanol, the washings being carried out with isopropanol. The films were washed finally by soaking about 12 hours in deionized water, followed by several washings with deionized water for 2 hour periods.

The anion exchange membrane discs thus treated were tested against *A. niger*, as described in Example 6. The discs maintained complete contact with the agar, and the average diameter of the zone of inhibition was 43 mm. No inhibition zone was produced by a control membrane not treated with the active agent.

It will be observed that both cation and anion exchange membranes treated with phenyl mercuric acetate exhibited microbicidal activity. It would appear that in the treatment of the cation exchange membrane, mercuric ion was adsorbed by ion exchange on the membrane, and in the treatment of the anion exchange membrane, phenyl acetate anion was adsorbed by ion exchange on the membrane.

Example 8

Tests were conducted employing polymeric films which contained no ion exchange groups, to determine whether activity would be exhibited due to physical retention of the active agent by the films. Saran films of various thicknesses were soaked in phenyl mercuric acetate isopropanol solution and washed, as in the preceding examples. The treated films exhibited no activity against any of the three test microorganisms.

Cellophane film of the type used for dialysis was contacted with terramycin aqueous solution and tested against *M. pyogenes* and *A. aerogenes*. The treated film exhibited no activity against either organism.

The invention thus provides a microbicidal bandage or dressing of an ion exchange membrane and adsorbed microbicidal agent for slow prolonged release of the agent. The ion exchange centers and points of adsorption and release of the active agent are uniformly distributed throughout the bandage, for most effective treatment. The bandage is porous and can be very thin, and is adapted for use in dry and wet treatments. There is no dependency upon the factors associated with the use of particulate ion exchange resins, and problems associated with their use are eliminated. The invention is applicable to treatment with a wide variety of ionic microbicidal agents, acting upon different microorganisms according to the agent employed in the bandage.

The invention is hereby claimed as follows:

1. A microbicidal bandage comprising an ion exchange membrane being a finely porous film of a homogeneous molecular dispersion of a water-insoluble acid and alkali-resistant thermoplastic film-forming polymer and a substantially linear polyelectrolyte, and an ionic microbicidal agent adsorbed on said ion exchange membrane.

2. A microbicidal bandage comprising an ion exchange membrane being a finely porous film of a homogeneous molecular dispersion of a water-insoluble, acid and alkali-resistant thermoplastic film-forming polymer and a substantially linear electronegative polyelectrolyte, and a cationic microbicidal agent adsorbed on said ion exchange membrane.

3. A microbicidal bandage comprising an ion exchange membrane being a finely porous film of a homogeneous molecular dispersion of a water-insoluble, acid and alkali-resistant thermoplastic film-forming polymer and a substantially linear electropositive polyelectrolyte, and an anionic microbicidal agent adsorbed on said ion exchange membrane.

4. A microbicidal bandage comprising an ion exchange membrane being a finely porous film of a homogeneous molecular dispersion of a film-forming vinyl chloride-acrylonitrile copolymer and polystyrene sulfonic acid having a minimum average molecular weight of about 5000, and a cationic microbicidal agent adsorbed on said ion exchange membrane.

5. A microbicidal bandage comprising an ion exchange membrane being a finely porous film of a homogeneous molecular dispersion of 70–90 by weight of a film-forming vinyl chloride-acrylonitrile copolymer and of 30–10% by weight of polystyrene sulfonic acid having a minimum average molecular weight of about 5000, and a cationic microbicidal agent adsorbed on said ion exchange membrane.

6. A microbicidal bandage comprising an ion exchange membrane being a finely porous film of a homogeneous molecular dispersion of a film-forming vinyl chloride-acrylonitrile copolymer and a poly(vinyl benzyl trialkyl ammonium salt) having a minimum average molecular weight of about 5000, and an ionic microbicidal agent adsorbed on said ion exchange membrane.

7. A microbicidial bandage comprising an ion exchange membrane being a finely porous film of a homogeneous molecular dispersion of 70–90% by weight of a film-forming vinyl chloride-acrylonitrile copolymer and of 30–10% by weight of a poly (vinyl benzyl trialkyl ammonium salt) having a minimum average molecular weight of about 5000, and an anionic microbicidal agent adsorbed on said ion exchange membrane.

8. A composition adapted for coating a surface to produce a microbicidal bandage thereon and comprising a solution of a water-insoluble, acid and alkali-resistant thermoplastic film-forming polymer and a substantially linear polyelectrolyte, admixed with an ionic microbicidal agent.

References Cited in the file of this patent

UNITED STATES PATENTS

| | | |
|---|---|---|
| 2,510,262 | Sollner | June 6, 1950 |
| 2,730,768 | Clarke | Jan. 17, 1956 |

UNITED STATES PATENT OFFICE
CERTIFICATE OF CORRECTION

Patent No. 2,838,045                          June 10, 1958

John W. Ryznar

It is hereby certified that error appears in the printed specification of the above numbered patent requiring correction and that the said Letters Patent should read as corrected below.

Column 2, line 61, for "membrance" read -- membrane --; column 6, line 34, for "about 7-90%" read -- about 70-90% --; line 48, for "excess of 0.05" read -- excess of 0.005 --; column 12, line 36, for "70-90" read -- 70-90% --; line 49, for "microbicidial" read -- microbicidal --.

Signed and sealed this 9th day of September 1958.

(SEAL)
Attest:

KARL H. AXLINE                                    ROBERT C. WATSON

Attesting Officer                                   Commissioner of Patents